July 8, 1924.
C. R. ISHBURN
1,500,874
AUTOMOBILE TIRE AND TOOL CASE
Filed April 17, 1922   2 Sheets-Sheet 1
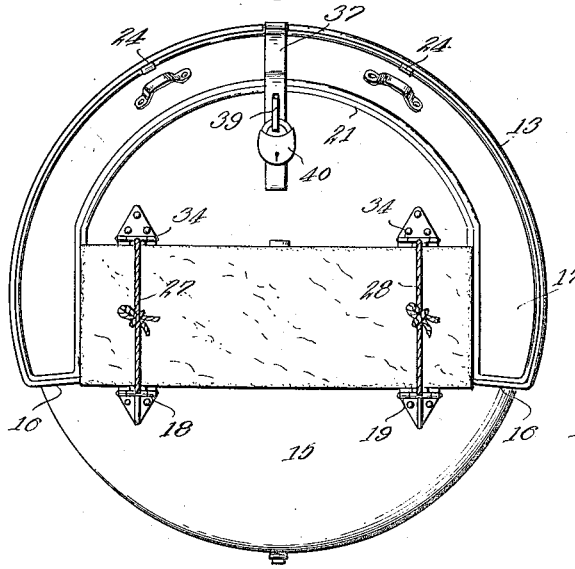
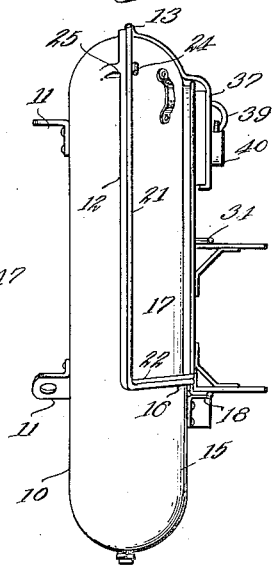
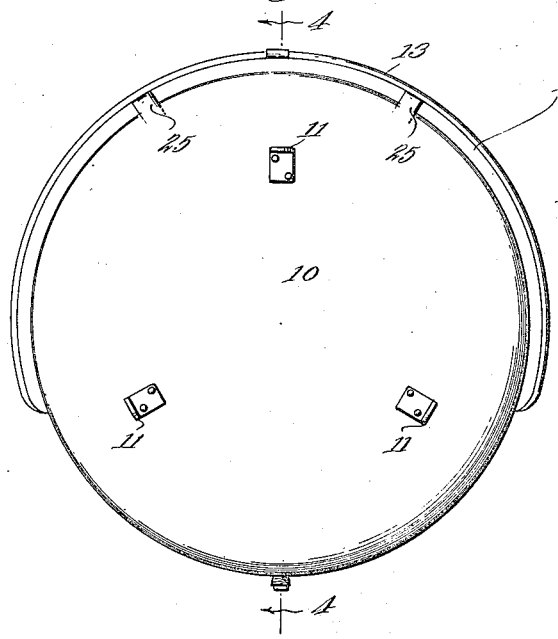
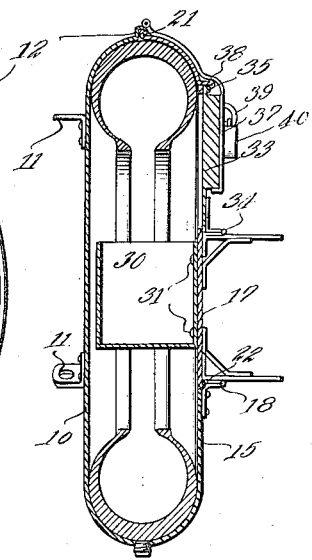
C. R. Ishburn
INVENTOR
BY Victor J. Evans
ATTORNEY
WITNESS:

July 8, 1924.

C. R. ISHBURN 1,500,874

AUTOMOBILE TIRE AND TOOL CASE

Filed April 17, 1922   2 Sheets-Sheet 2

Patented July 8, 1924.

1,500,874

UNITED STATES PATENT OFFICE.

CHARLES R. ISHBURN, OF HELENA, ARKANSAS.

AUTOMOBILE TIRE AND TOOL CASE.

Application filed April 17, 1922. Serial No. 553,541.

*To all whom it may concern:*

Be it known that I, CHARLES R. ISHBURN, a citizen of the United States, residing at Helena, in the county of Phillips and State of Arkansas, have invented new and useful Improvements in Automobile Tire and Tool Cases, of which the following is a specification.

This invention relates to a combined tire and tool case, and the object is to provide a weather-proof case, preferably made entirely of metal, and adapted to receive a tire,—special provision being made within the casing for tools, and the casing being provided with a plurality of covers, so arranged that the tire compartment may be opened without opening the tool compartment, and vice versa.

A further object is to provide a metallic casing with an approximately semi-circular cover, the cover serving to mount the tool box.

A further object is to provide a detachable tool box, so that a wire wheel or disk wheel may be carried, if desired.

A still further object is to provide independent securing devices for the separate closures, and to provide in addition thereto means for locking both of the closures at one time.

With the foregoing and other objects in view, the invention consists in the novel construction and arrangement of elements described and claimed, it being understood that modifications may be made within the scope of the claim without departing from the spirit of invention.

Figure 5:
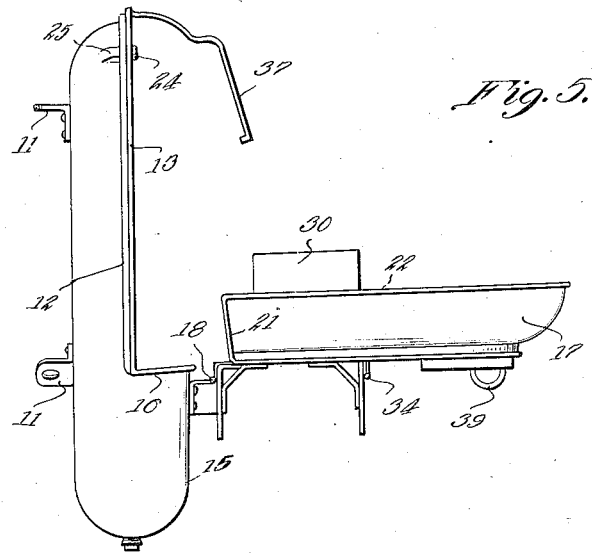
Figure 6:
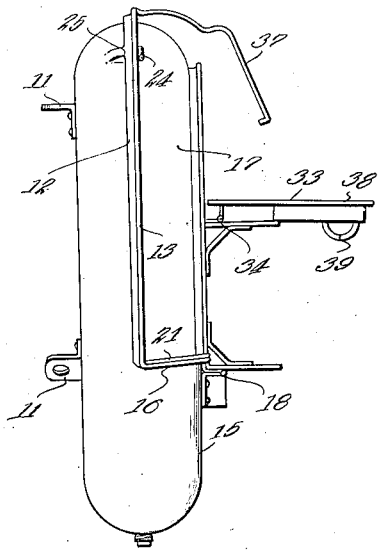
Figure 7:
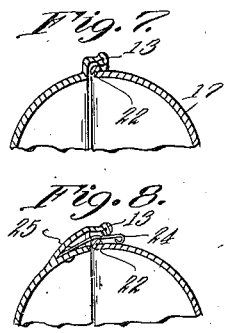
Figure 8:
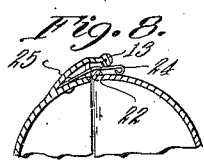

In the drawings, Figure 1 shows the device in elevation; Figure 2 is an edge elevation; Figure 3 is an elevation from the reverse side, as compared with Figure 1; Figure 4 is a section on line 4—4 of Figure 3; Figure 5 is a view similar to Figure 2, but with the main cover in horizontal position; Figure 6 shows only the small cover in horizontal position, the remainder of the view being similar to Figure 2; Figures 7 and 8 are fragmentary views, in section, of details described below.

In carrying out the invention, I provide a case having a back 10 on which lugs or brackets 11 are mounted, for the purpose of permitting of the attachment of the case to the body of a car, or to the rim commonly used for carrying extra tires.

Forming a part of this back 10, is a circumferential flange 12, the edge of which is provided with a rolled and offset circumferential portion 13.

The front of the case includes a lower permanently connected section or element 15 provided with a rolled circumferential edge 16, with which the rolled portion 13 cooperates, affording a dust and weather-proof joint.

The segmental cover 17 is hinged to the element 15, the hinges being designated 18 and 19, and the edge portions of this segmental cover are also rolled as shown at 21 and 22, for the purpose just indicated. This cover is retained by spring latches 24, these latches being protected from the weather, as shown at 25. The door, closure, or cover thus described does not interfere with the luggage carriers including the straps or cords 27 and 28.

The tool box 30 is detachably connected with the cover just referred to, by means of bolts or the like, designated 31, and this tool box swings into the central portion of the case when the segmental cover is closed, and therefore moves outwardly to the position shown in Figure 5, when this cover is opened. A cover for the tool box is designated 33, being hinged at 34 and secured by catches 35. The rolled edges are shown at 38. A hasp 37 is secured at 39 and springs into the position shown in Figure 4, passing over the looped portion 39, and being secured by padlock 40. It will be observed that the covers are independently secured by the latches, and that both covers are locked at one time by means of the devices referred to.

If it is desired to carry a wire wheel, or a disk wheel, the tool box may be removed by removing elements 31, so that all of the space within the complete device is available. Brackets 34', associated with the hinges, limit the movement of the covers.

Having thus described the invention, what is claimed is:

In a case of the class described, a circular back including a circumferential flange, a front section for partly closing a compartment formed between said section and the back, a segmental cover hinged to the said front section, and having an edge portion corresponding with the oppositely located portion of the back, said cover including a transverse solid portion, and having a cutaway portion adjacent thereto, a receptacle detachably connected with the inner side of said transverse portion, and a second cover hinged to the transverse portion, said receptacle being connected with the cover first named at a point between the hinged connection thereof and the hinged connection for the second cover, and devices for retaining the covers in horizontal position when opened.

In testimony whereof I affix my signature.

CHARLES R. ISHBURN.